United States Patent [19]

Saito

[11] Patent Number: 4,948,243

[45] Date of Patent: Aug. 14, 1990

[54] MIRROR-ANGLE ADJUSTING ARRANGEMENT

[75] Inventor: Taizo Saito, Tokyo, Japan

[73] Assignee: Asahi Kogaku Kogyo Kabushiki Kaisha, Tokyo, Japan

[21] Appl. No.: 301,063

[22] Filed: Jan. 25, 1989

[30] Foreign Application Priority Data

Feb. 19, 1988 [JP] Japan ............... 63-20650[U]

[51] Int. Cl.⁵ .............................. G02B 5/08
[52] U.S. Cl. ..................... 350/639; 248/476
[58] Field of Search ................. 350/631–633, 350/635, 639; 248/468, 476–478, 491

[56] References Cited

U.S. PATENT DOCUMENTS

| 4,448,385 | 5/1984 | Matthys | 248/179 |
| 4,648,692 | 3/1987 | Kinoshita | 248/479 |
| 4,717,241 | 1/1988 | Aagano | 350/633 |

FOREIGN PATENT DOCUMENTS

| 58-211112 | 12/1983 | Japan | 350/631 |
| 1578950 | 11/1980 | United Kingdom | 350/635 |

OTHER PUBLICATIONS

"Adjustable Mirror Mount", Adams et al., Feb. 1976, IBM Tech. Disc. Bull., pp. 2780–2781.

Primary Examiner—Bruce Y. Arnold
Assistant Examiner—Ryan
Attorney, Agent, or Firm—Sandler, Greenblum & Bernstein

[57] ABSTRACT

In a mirror-angle adjusting arrangement, at least one adjusting member is arranged between a surface formed on a mirror support structure and a mirror. The adjusting member is reciprocatively movable along the surface while contacting mirror in such a fashion that the angle of the mirror with respect to the surface varies upon movement of the adjusting member.

25 Claims, 3 Drawing Sheets

MIRROR-ANGLE ADJUSTING ARRANGEMENT

BACKGROUND OF THE INVENTION

This invention relates to a mirror-angle adjusting arrangement for adjusting a setting angle of a mirror mounted to a support structure of, for example, an optical instrument or the like.

Conventionally, there is known an apparatus such as a copying machine, a laser beam printer or the like, which utilizes a Xerographic system. In such an apparatus, a mirror for reflecting light from a light source to direct the reflected light in a predetermined direction is fixedly mounted at a predetermined attaching position and at a predetermined setting angle on a support structure such as a chassis, a frame or the like of the apparatus. At the mirror mounting position, a mounting surface is formed on which the mirror rests. The arrangement is such that when the mirror is mounted on the mounting surface, the setting angle of the mirror is inevitably determined.

In an apparatus in which a plurality of mirrors are employed to turn an optical path, however, a slight error in the setting angle of each mirror results in a large error in the entire optical path. Accordingly, the mirrors are so arranged as to be adjustable in their respective setting angles.

FIG. 4 of the accompanying drawings illustrates an example of the conventional mirror-angle adjusting arrangement. A fulcrum 51 in the form of a projection having a triangular cross-sectional shape is formed on a mirror mounting surface 50 of a support structure 56 at a location adjacent one side of an elongated mirror 54 and adjacent one end thereof. A threaded through bore 55 is formed in the mirror mounting surface 50 at a location adjacent the other side of the mirror 54 and adjacent the one end thereof. The threaded through bore 55 has its axis extending perpendicularly to the mirror mounting surface 50. A set screw 52 is threadably engaged with the threaded through bore 55 such that a forward end of the set screw 52 projects from the mirror mounting surface 50. The mirror 54 is urged against the fulcrum 51 and the set screw 52 by means of a biasing spring 53 so that the mirror 54 is set in position. The set screw 52 is turned to vary the projecting amount of the forward end of the set screw 52, thereby moving the mirror 54 angularly about the fulcrum 51 to adjust the setting angle of the mirror 54.

In connection with the above, the mirror 54 is normally supported at its one end by two points including the fulcrum 51 and the set screw 52, while the other end of the mirror 54 is supported by a single fulcrum. Thus, the mirror 54 is maintained at the predetermined setting angle by a so-called three-point support.

With the conventional arrangement described above, the threaded through bore 55 with which the set screw 52 is threadably engaged is required to be formed through the mirror mounting surface 50, perpendicularly to the mirror 54. However, processing of the threaded through bore 55 is troublesome and cumbersome. In addition, if the support structure 56 is integrally formed by means of plastic molding, die casting or the like, restrictions are imposd on the sliding direction of the mold by the angle of the threaded through bore 55. Therefore, the configuration of the support structure 56, such as a chassis, a frame or the like is restricted, resulting in a reduction of the degree of freedom of the design.

Furthermore, since the set screw 52 is required to be turned from the side opposite to the mirror 54 to adjust the projecting amount of the forward end of the set screw 52, the operability of the adjustment is considerably inferior.

SUMMARY OF THE INVENTION

It is therefore an object of this invention to provide an improved mirror-angle adjusting that is capable of easily adjusting a setting angle of a mirror from the side of the mirror, eliminates restrictions on a molding configuration of a support structure, provides superior operability and a high degree of freedom of the design.

According to the invention, there is provided a mirror-angle adjusting arrangement comprising:
  a mirror having a plurality of sides;
  a support structure for the mirror, the support structure having a surface which faces one of the plurality of sides of the mirror; and
  adjusting means arranged between the surface and the one side of the mirror, adjusting means being movable along the surface while contacting one side of the mirror in such a fashion that the angle of the mirror with respect to the surface varies upon movement of the adjusting means.

With the morror-angle adjusting arrangement according to the present invention, adjustment of the setting angle of the mirror can be made from the side of the mirror, making it possible to efficiently effect the adjusting operation.

Additionally, it can be dispensed with to form a threaded through bore (see the threaded through bore 55 in FIG. 4) for a set screw perpendicularly to the aforesaid plane, so that if the support structure is formed by the use of a mold, it is possible to prevent the threaded through bore from imposing restrictions on the configuration of the support structure. Thus, the degree of freedom of the design can be raised, making it possible to rationalize the production and to reduce the cost.

Furthermore, an amount of adjustment of the setting angle of the mirror can optionally be set by suitably altering the angle of inclination of the inclined surface with respect to the plane, making it further possible to finely adjust the setting angle of the mirror.

BRIEF DESCRIPTION OF THE ACCOMPANYING DRAWINGS

DESCRIPTION OF THE EMBODIMENT

Figure 1:
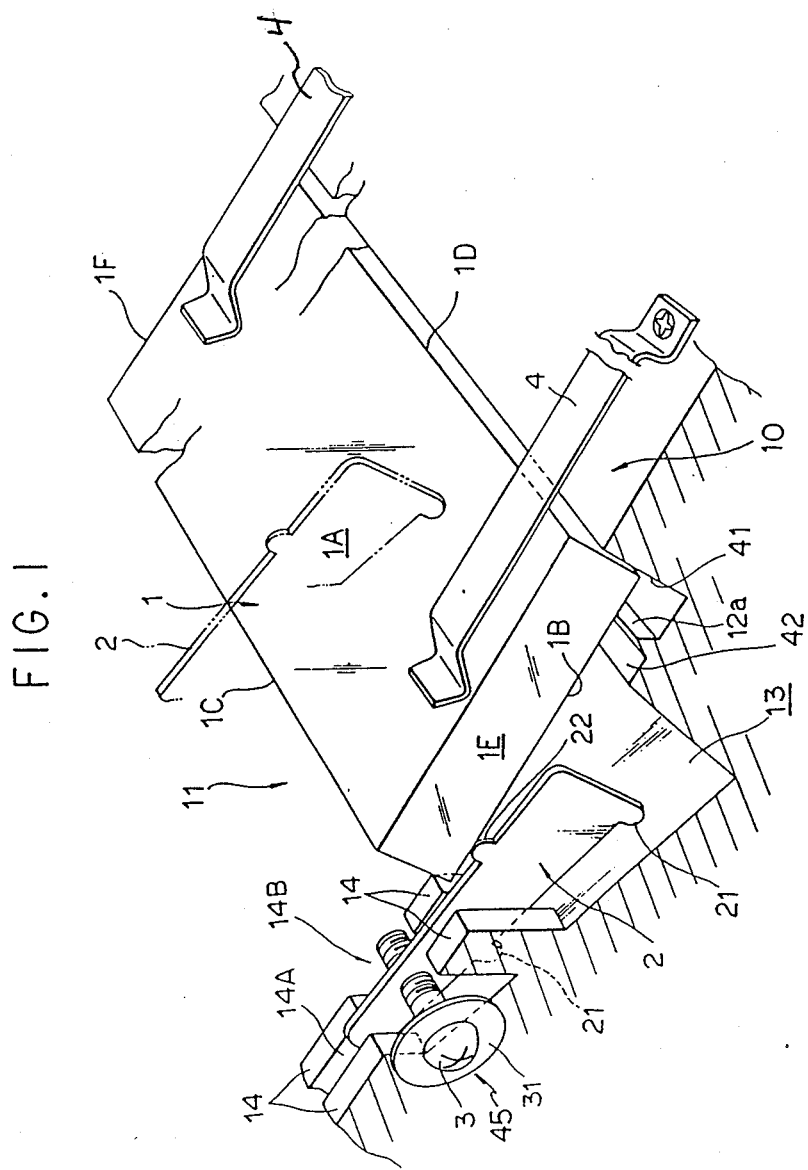
FIG. 1 is a cross-sectional perspective view of a mirror-angle adjusting arrangement according to a preferred embodiment of the present invention.

Referring to FIGSS. 1 through 3, there is shown a mirror-angle adjusting arrangement according to the present invention. A mirror 1 has a front side 1A and a back side 1B, and is rectangular in shape having opposite sides 1C and 1D and opposite ends 1E and 1F. The mirror 1 is so designed as to be mounted, at a predetermined setting angle, to a support structure 10 such as a chassis, a frame or the like of an optical instrument, for example.

A mirror mounting section 11 of the support structure 10, has a reference surface 41 formed on which one of the opposite sides 1D of the mirror 1 rests. The support structure 10 is formed at the mirror mounting section 11 with an inclined surface 13 inclined with respect to a first plane p(FIG. 2) which is perpendicular to the reference surface 41 and which faces toward the back side 1B of the mirror 1. The inclined surface 13 is so inclined as to define an angel θ with respect to the first plane p such that a distance normal to the first plane p and between the inclined surface 13 and the first plane p decreases gradually away from the reference surface 41.

Figure 2:
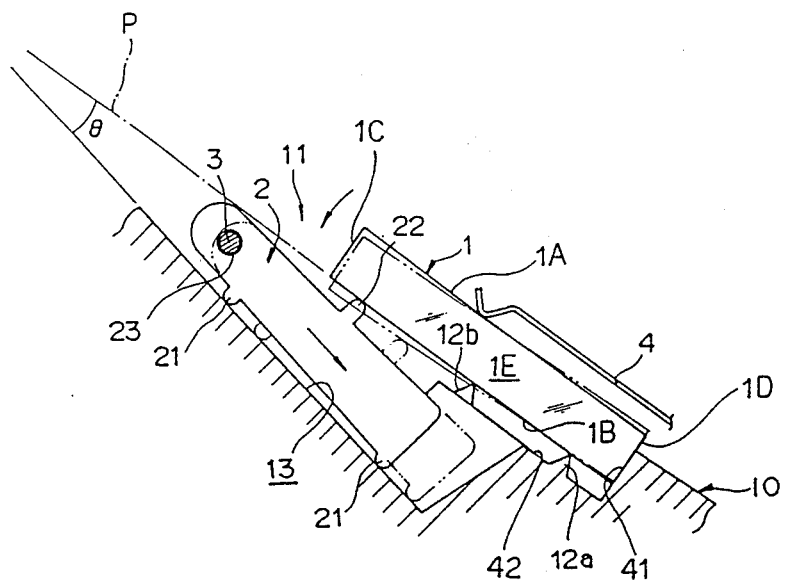
FIG. 2 is a generally diagrammatic cross-sectional view showing the relationship between a setting angle of a mirror employed in the embodiment of FIG. 1 and movement of an adjusting member.
Figure 3:
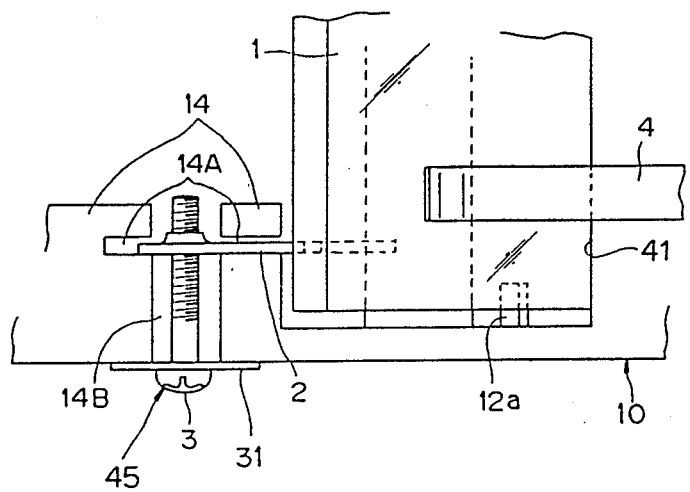
FIG. 3 is a plan view of the arrangement shown in FIG. 1.
Figure 4:
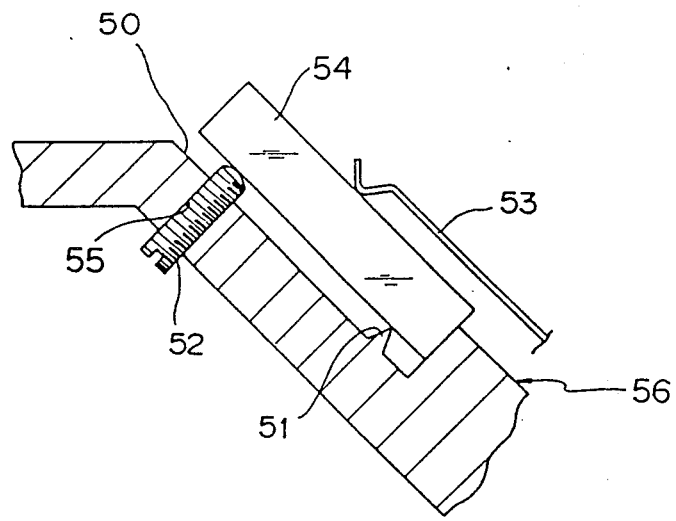
FIG. 4 is a cross-sectional view of a conventional mirror-angle adjusting arrangement.

A pair of fulcrums 12a and 12b, on which the back side 1B of the mirror 1 rests, are formed on a step surface 42 between the inclined surface 13 and the reference surface 41. Each of the fulcrums 12a and 12b is in the form of a projection which has a triangular cross-sectional shape as shown in FIGS. 1 and 2 and which extends a predetermined distance in parallel relation to the reference surface 41 as shown in FIG. 3. One of the pair of fulcrums 12a is located adjacent the opposite end 1E of the mirror 1 adjacent the side 1D thereof. The other fulcrum 12b is located at a center of the other end 1F of the mirror 1.

An adjusting member 2, in the form of an elongated thin plate, is arranged between the inclined surface 13 and the back side 1B of the mirror 1, in a second plane perpendicular to the first plane p and to the reference surface 41. The mirror 1 is supported on the inclined surface 13 through the adjusting member 2. That is, the adjusting member 2 has one side which is formed substantially at its center with a single support projection 22 which is abutted against the back side 1B of the mirror 1 to support the same. The other side of the adjusting member 2 is formed with a pair of abutment projections 21 which are abutted against the inclined surface 13. The pair of abutment projections 21 are spaced a predetermined distance from each other along the other side of the adjusting member 2, that is, along the inclined surface 13. Furthermore, a threaded bore 23 is formed in the adjusting member 2 at a location adjacent longitudinal one end thereof as shown in FIG. 2.

The support structure 10 has a guide projection 14 provided integrally on the inclined surface 13 for guiding a sliding movement of the adjusting member 2 along the inclined surface 13 toward and away from the reference surface 41. Specifically, the guide projection 14 is formed with a slit 14A in the aforesaid second plane. The slit 14A has its bottom contiguous to the inclined surface 13. The adjusting member 2 is fitted in the slit 14A for sliding movement therealong.

The guide projection 14 is formed with a cut-out 14B which extends perpendicularly to the slit 14A. A fixing unit 45 is associated with the cut-out 14B. Specifically, the fixing unit 45 includes a headed screw 3 whose axis extends perpendicularly to the second plane. The screw 3 is arranged in the cut-out 14B and has a forward end threadably engaged with the threaded bore 23 in the adjusting member 2. The fixing unit 45 further includes a clamp plate 31 in the form of a washer which is arranged between a head of the screw 3 and a side surface of the guide projection 14 parallel to the aforesaid second plane. That is, the clamp plate 31 is formed with a central bore through which the screw 3 passes. The clamp plate 31, in the form of a washer, has an outer diameter that is larger than a width of the cut-out 14B. The arrangement is such that when the screw 3 is tightened into the threaded bore 23, the clamp plate 31 and the adjusting member 2 cooperate with each other to clamp therebetween a portion of the guide projection 14 which extends between the slit 14B and the side surface of the guide projection 14, thereby fixing the adjusting member 2 to the guide projection 14 such that the adjusting member 2 is immovable along the slit 14A. On the other hand, when the screw 3 is loosened, clamping of the portion of the guide projection 14 by the clamp plate 31 and the adjusting member 2 is released, thereby permitting the adjusting member 2 to move along the slit 14A.

A pair of leaf springs 4 are provided having one end fixedly mounted to the support structure 10. The other ends of the respective leaf springs 4 are abutted against the front side 1A of the mirror 1, thereby resiliently or elastically urging the mirror 1 against the fulcrums 12a and 12b and the adjusting member 2.

The mirror-angle adjusting arrangement constructed as above adjusts the setting angle of the mirror 1 in the following manner.

The screw 3 is loosened to release the clamping of the portion of the guide projection 14 by the adjusting member 2 and the clamp plate 31, permitting the adjusting member 2 to move along the slit 14A. Subsequently, the adjusting member 2 is moved slidingly along the slit 14A.

The abutment projections 21 on the other side of the adjusting member 2 move in abutment with the inclined surface 13. Since, as described above, the inclined surface 13 is inclined with respect to the first plane p at the predetermined angle θ, the height of the support projection 22 from the inclined surface 13 varies with the sliding movement of the adjusting member 2 along the slit 14A. Due to the variation in the height of the support projection 22, the mirror 1 moves angularly about the fulcrums 12a and 12b so that the setting angle of the mirror 1 varies.

After the adjusting member 2 is slidingly moved to adjust the setting angle of the mirror 1 to a desired angle, the screw 3 is tightened to fix the adjusting member 2 to the guide projection 14.

It is understood that the invention is not limited to the above-described specific embodiment. Various modifications and changes can be made to the invention without departing from the scope of the invention. For example, the adjusting member 2 may be arranged at a center of the side 1C of the mirror 1, as indicated by the double dotted lines in FIG. 1. In this case, the pair of fulcrums are arranged respectively at the opposite ends 1E and 1F of the mirror 1 and adjacent the side 1D thereof. In this connection, it is needless to say that a pair of adjusting members may be arranged respectively at the opposite ends 1E and 1F of the mirror 1 and adjacent the other side 1C thereof.

Furthermore, the mirror 1 should not be limited to the illustrated plain mirror; the invention is equally applicable to a concave or convex mirror.

Moreover, the inclined surface 13 may be so inclined that a distance normal to the first plane p and between the inclined surface 13 and the first plane p increases gradually away from the reference surface 41.

What is claimed is:

1. A mirror-angle adjusting arrangement, comprising: a mirror having a plurality of sides;

a support structure for said mirror, said support structure having a surface with at least a first portion which contacts a section of one side of said mirror; and means for adjusting an angle of said mirror, said adjusting means being movably positioned between at least a second portion of said surface of said support structure and said one side of said mirror, said adjusting means being movable along at least said support structure second portion and comprising means for contacting said mirror such that said angle of said mirror, with respect to at least said support structure surface second portion, varies with movement of said adjusting means.

2. The mirror-angle adjusting arrangement according to claim 1, further comprising means for fixing said adjusting means to said support structure so as to fix the angle of said mirror with respect to said surface.

3. The mirror-angle adjusting arrangement according to claim 1, further comprising means for biasing said mirror against said adjusting means.

4. The mirror-angle adjusting arrangement according to claim 3, wherein said biasing means includes at least one leaf spring having one end fixedly mounted to said support structure and the other end abutted proximate a side of said mirror.

5. The mirror-angle adjusting arrangement according to claim 1, wherein said support structure has fulcrum means on which one side of said mirror rests, such that when said adjusting means reciprocatively moves along said surface, said mirror moves angularly about said fulcrum means.

6. The mirror-angle adjusting means arrangement according to claim 5, wherein said adjusting means is formed by a pair of elongated plate-like adjusting members that are substantially parallel to each other, and said fulcrum means comprise a pair of spaced fulcrums corresponding to said adjusting members.

7. The mirror-angle adjusting means arrangement according to claim 5, wherein said fulcrum means comprises a pair of spaced fulcrums and said adjusting means is arranged at a center of said pair of fulcrums so that said adjusting means and said pair of fulcrums form a three-point support mechanism.

8. The mirror-angle adjusting means arrangement according to claim 1, wherein said adjusting means comprises an elongated plate-like adjusting member, and said support structure includes guide means on said surface for guiding a sliding movement of said adjusting member along said surface.

9. The mirror-angle adjusting arrangement according to claim 8, wherein said guide means is formed by a guide projection provided on said surface, said guide projection being formed therein with a slit having its bottom contiguous to said surface, said adjusting member being fitted in said slit for effecting a sliding movement therealong.

10. The mirror-angle adjusting means arrangement according to claim 9, further comprising means for attaching said adjusting means to said support structure so as fix said angle of said mirror with respect to said support structure surface, said fixing means comprising a headed screw whose axis extends through a cut-out formed in said guide projection that extends perpendicularly to said slit, and whose forward end engages said adjusting member, a clamp plate being arranged between a head of said screw and a said surface of said guide projection, wherein when said screw is tightened, said clamp plate and said adjusting member cooperate with each other to clamp therebetween a portion of said guide projection extending between said slit and said side surface of said guide projection, thereby fixing said adjusting member to said guide projection, while when said screw is loosened, clamping of said portion of said guide projection by said clamp plate and said adjusting member is released to permit said adjusting member to slidingly move along said slit.

11. A mirror-angle adjusting arrangement, comprising:

a mirror having a plurality of sides;

a support structure for said mirror having a surface which faces one of said plurality of sides of said mirror; and means for adjusting an angle of said mirror, said adjusting means being arranged between said surface of said support structure and one side of said mirror, said adjusting means being movable along said surface of said support structure while contacting one side of said mirror in such a fashion that said angle of said mirror with respect to said support structure surface varies upon the movement of said adjusting means, wherein said support structure has a fulcrum means on which one side of said mirror rest such that when said adjusting means moves reciprocally along said surface, said mirror moves angularly about said fulcrum means.

12. The mirror-angle adjusting means arrangement according to claim 11, wherein said adjusting means is formed by a pair of elongated plate-like adjusting members that are substantially parallel to each other, and said fulcrum means comprise a pair of spaced fulcrums corresponding to said adjusting members.

13. The mirror-angle adjusting means arrangement according to claim 11, wherein said fulcrum means comprise a pair of spaced fulcrums and said adjusting means is arranged at a center of said pair of fulcrums so that said adjusting means and said pair of fulcrums form a three-point support mechanism.

14. A mirror-angle adjusting arrangement, comprising:

a mirror having a plurality of sides;

a support structure for said mirror having a surface which faces one of said plurality of sides of said mirror, said support structure surface having means for guiding sliding movement of said adjusting member along said support structure surface;

means for adjusting an angle of said mirror, said adjusting means being arranged between said surface of said support structure and one side of said mirror, said adjusting means being movable along said surface of said support structure while contacting one side of said mirror in such a fashion that said angle of said mirror with respect to said support structure varies upon the movement of said adjusting means, said adjusting means comprising an elongated plate-like adjusting member, and said support structure surface having means for guiding said adjusting member during sliding movement along said support structure surface, said guide means being formed by a guide projection provided on said support structure surface, and is formed therein with a slit having its bottom contiguous to said support structure surface, said adjusting member being fitted in said slit for effecting sliding movement therealong, said guide projection being formed with a cut-out that perpendicularly extends to said slit; and means for fixing said adjusting means to said support structure so as to fix the angle of said mirror with respect to said support structure surface, said fixing means comprising a headed screw whose axis extends through said cut-out and whose forward end is threadedly engaged with said adjusting member, a clamp plate being positioned between a head of said screw and a side surface of said guide projection, wherein when said screw is tightened, said clamp plate and said adjusting member cooperate with each other to clamp therebetween a portion of said guide projection extending between said slit and said side surface of said guide projection, thereby fixing said adjusting member to said guide projection, and when said screw is loosened, clamping of said portion of said guide projection by said clamp plate and said adjusting member is released to permit said adjusting member to slidably move along said slit.

15. A mirror-angle adjusting arrangement, comprising:

a mirror having a plurality of sides;

a support structure for said mirror having a surface which faces one of said plurality of sides of said mirror;

means for adjusting an angle of said mirror, said adjusting means being arranged between said surface of said support structure and one side of said mirror, said adjusting means being movable along said surface of said support structure while contacting one side of said mirror in such a fashion that said angle of said mirror with respect to said support structure surface varies upon the movement of said adjusting means; and a leaf spring for biasing said mirror against said adjusting means, said leaf spring having one end fixedly mounted to said support structure, the remaining end of said leaf spring being proximate a side of said mirror.

16. A mirror-angle adjusting arrangement, comprising:

a mirror;

means for supporting said mirror, said supporting means having non-parallel first and second surfaces for supporting said mirror, a first portion of said mirror being positioned on one of said surfaces of said supporting means; and means for adjusting an angle of said mirror with respect to said first surface, said adjusting means being interposed between a second portion of said mirror and said second surface of said supporting means, said adjusting means being movable along said second surface of said supporting means to vary said angle of said mirror with respect to said first surface of said supporting means.

17. The mirror-angle adjusting arrangement of claim 16, further comprising means for securing said adjusting means to said supporting means so as to maintain a desired angle of said mirror.

18. The mirror-angle adjusting arrangement of claim 16, further comprising means for biasing said mirror against said adjusting means.

19. The mirror-angle adjusting arrangement of claim 16, wherein said first surface of said supporting means has a fulcrum, said first portion of said mirror being positioned on said fulcrum.

20. The mirror-angle adjusting arrangement of claim 19, wherein said mirror pivots about said fulcrum as said adjusting means moves along said second surface of said supporting means.

21. The mirror-angle adjusting arrangement of claim 16, wherein said adjusting means comprises an elongated plate-like member that is positioned in a slit located in said second surface of said supporting means.

22. The mirror-angle adjusting arrangement of claim 21, wherein said elongated plate-like member includes a support projection that contacts said second portion of said mirror.

23. The mirror-angle adjusting arrangement of claim 22, further comprising means for securing said elongated plate-like member to said supporting means so as to maintain a desired angle of said mirror.

24. The mirror-angle adjusting arrangement of claim 23, further comprising means for biasing said mirror against aid elongated plate-like member.

25. The mirror-angle adjusting arrangement of claim 24, wherein said first surface of said supporting means has a fulcrum, said first portion of said mirror being positioned on said fulcrum so that said mirror pivots about said fulcrum as said elongated plate-like member moves along said slit in said second surface of said supporting means.

* * * * *

UNITED STATES PATENT AND TRADEMARK OFFICE
CERTIFICATE OF CORRECTION

PATENT NO. : 4,948,243

DATED : August 14, 1990

INVENTOR(S) : Taizo SAITO

It is certified that error appears in the above-identified patent and that said Letters Patent is hereby corrected as shown below:

On the cover page section [56]/U.S. Patent Documents, insert ---3,478,608 11/1969 Met---.

On the cover page section [56]/Other Publications, after "Bull.," insert ---Vol. 18, No. 9,---.

At column 1, line 2, change "ARRANGEMENT cl" to ---ARRANGEMENT---.

At column 2, line 22, change "the one side" to ---one side---.

At column 2, line 27, change "morror" to ---mirror---.

At column 2, line 62, change "FIGSS." to ---FIGS.---.

At column 3, line 8, change "p(FIG. 2)" to ---P (FIG. 2)---.

At column 3, line 11, change "angel" to ---angle---.

At column 3, line 12, change "p" (both occurrences) to ---P---.

At column 3, line 14, change "p" to ---P---.

At column 3, line 31, change "p" to ---P---.

At column 4, line 34, change "p" to ---P---.

At column 4, line 63, change "p" to ---P---.

At column 4, line 64, change "p" to ---P---.

At claim 10, line 10, change "said surface" to ---side surface---.

Signed and Sealed this

Second Day of March, 1993

*Attest:*

STEPHEN G. KUNIN

*Attesting Officer*     *Acting Commissioner of Patents and Trademarks*